INVENTORS
Glen H. Thomas &
Eugene R. Lucka,
BY
ATTORNEYS 3,115,042
BALANCING APPARATUS
Glen H. Thomas, Columbus, and Eugene R. Lucka, Hilliard, Ohio, assignors to International Research and Development Corporation, Worthington, Ohio, a corporation of Ohio
Filed Sept. 9, 1960, Ser. No. 55,050
6 Claims. (Cl. 73—466)

This invention relates to an improved electrical balancing machine and more particularly to an electrical balancing machine for indicating both the position and magnitude of unbalance of a rotor in a single plane.

Quantity production of rotors for dynamo-electric machines and for very high speed turbines and compressors now commonly used in rocket and missile production has brought about the need for faster methods of unbalance indication and correction. In addition to this, the high speed at which the latter types of rotors operate produces a necessity for a refinement of balance which was not heretofore encountered. In almost all instances, it is desirable to balance a rotor at its operating speed even where that speed is extremely high and it is desirable to be able to quickly balance different types of motors without time consuming adjustment of the calibration of the balancing equipment.

In single plane balancing it is unnecessary to eliminate or compensate for cross effect and, for this reason, it is possible to utilize simpler equipment than is necessary in two plane balancing. Some type of calibration of the equipment is necessary, however, and two approaches have generally been predominate. In the simplest system from the standpoint of equipment involved, a cut and try balancing procedure is utilized wherein repeated trial balacing weights are added until a satisfactory condition of balance exists. In the second approach a trial weight of known value is added to the rotor and the knowledge of the position and value of the weight is used to calibrate the equipment. With this operation numerous runs of the equipment are necessary if balancing is to be achieved without having to leave the trial weight permanently on the rotor.

According to the present invention it has now been found that it is possible to achieve single plane balancing at normal rotor speed utilizing but two runs during which both calibration and measurement are accomplished. The trial weight may then be removed and balancing effected. The invention is characterized by both the simplified equipment and also the particular method in which that equipment is utilized to secure a quicker balance with a considerably reduced possibility of error. As a matter of fact, the method and equipment make it possible for a completely untrained operator to secure satisfactory rotor balance in a shorter period of time than would have been possible with the older and conventional electrical systems.

The apparatus of the invention includes a measurement channel which is connectable between a transducer and a conventional vibration analyzer wherein this channel includes an amplitude adjusting unit and a phase shifter capable of producing 360° of phase shift. The apparatus also includes a calibration channel having an amplitude adjusting unit and a phase shifter also copable of producing 360° of phase shift. In utilizing the unit the rotor or work piece is associated with the transducer, a reference mark is placed on the rotor, and an angular scale is stationarily mounted adjacent the reference mark to give an indication of the position of the reference mark under the illumination of the stroboscopic light of the analyzer. The rotor is now brought up to the speed at which balancing is to be effected and the measurement channel is connected between the transducer and the analyzer. The phase shifter unit in the measurement channel is adjusted to bring the reference marker into alinement with the zero marker on the stationary scale to establish a reference position under the illumination of the stroboscopic light. The rotor is now stopped and a trial weight of known value is attached thereto at the position of the reference marker.

The rotor is again brought up to speed and this time the signal from the transducer is fed through the measurement channel as before but also through the calibration channel whose output is fed into the measurement channel. The amplitude control unit and phase shifter of the calibration channel are now adjusted until the analyzer gives the same reading as was obtained before the addition of the trial weight. Under such circumstances the calibration channel is producing a signal equal and opposite to that which would be produced by the trial weight alone. The transducer is now disconnected from the measurement channel but continues to feed a signal through the calibration channel and thence through the measurement channel. The signal is the signal produced by the trial weight and it is now possible to adjust the amplitude control unit of the measurement channel to cause the amplitude meter in the analyzer unit to give a direct reading in terms of units of weight of the trial weight. Likewise, it is possible to adjust the phase shifter in the measurement channel to bring the reference mark on the rotor into alinement with the zero marker on the stationary scale to produce a zero lag angle and thereby render the readings of the stroboscopic light direct.

The connections of the apparatus are now again switched so that the transducer feeds a signal through the measurement channel and also feeds a signal through the calibration channel into the measurement channel with the composite signal actuating the analyzer. The signal from the calibration channel cancels the effect of the added trial weight so that the analyzer now directly reads both the amount and position of unbalance of the rotor under test.

It is accordingly a primary object of the present invention to provide an improved single plane balancing machine and method which provides a maximum simplicity in both equipment and operation.

It is another object of the invention to provide an improved single plane balancing machine which permits two run balancing even though the trial weight is removed at the end of the balancing operation.

It is another object of the invention to provide an improved single plane balancing apparatus and method wherein a calibration channel is utilized in conjunction with a trial weight to calibrate the indicating instrument and is then utilized to electronically eliminate the effect of the trial weight.

It is still another object of the invention to provide an improved apparatus and method for balancing a rotor in a single plane utilizing but two runs of the rotor and producing direct reading results.

It is still another object of the invention to provide an improved method and apparatus for single plane balancing which permits the balancing operation to be carried out by personnel unskilled in the art of balancing or vibration analysis.

These and further objects of the invention will become more apparent upon reference to the following specification and claims and appended drawings wherein:

FIGURE 3 is a vertical elevation of a rotor to be balanced showing the pick-up and reference marks.

Figure 1:
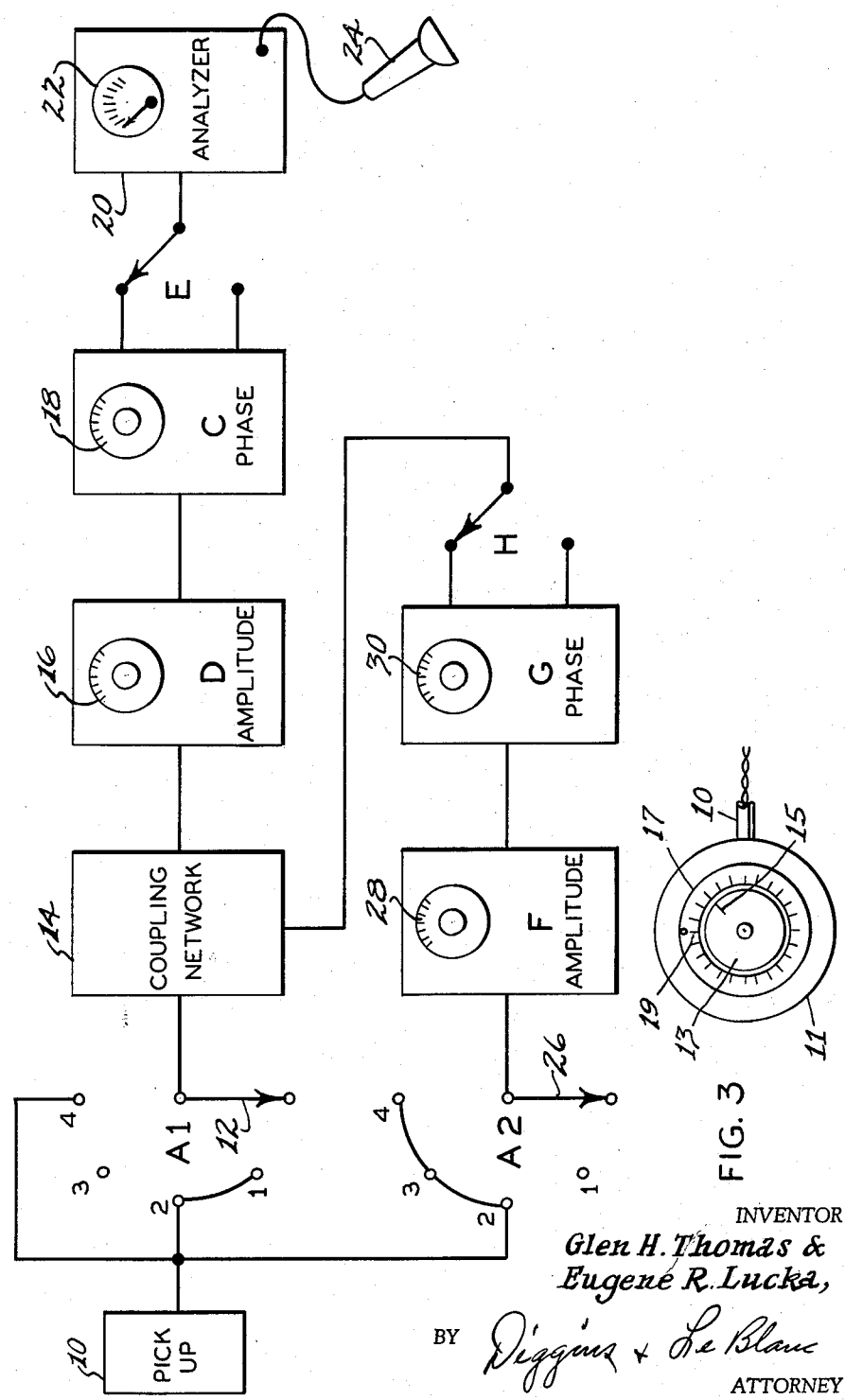
FIGURE 1 is a block diagram of a balancing apparatus constructed according to the present invention.

Referring to FIGURE 1, a suitable vibration transducer or pick-up 10 is connected to contacts 1, 2 and 4 of deck A1 and contacts 2, 3 and 4 of deck A2 of a two deck five position rotary switch A. The swinger 12 of deck A1 is connected to a coupling network 14 which in turn feeds an amplitude adjusting unit D having a control 16 and a phase shifting unit C having a control 18. The output of the phase shifting unit C is fed to a phase reversal switch E capable of selecting outputs 180° different in phase.

The output of the phase reversal switch E is fed to a suitable vibration analyzer 20 having an amplitude indicating meter 22 and a stroboscopic light 24 for indicating the position of unbalance. Any suitable vibration analyzer may be utilized such as, for example, the type shown in Ongaro Patent No. 2,711,647.

The swinger 26 of deck A2 of rotary switch A feeds an input to an amplitude adjusting unit F having a control 28 and to a phase shifting unit G having a control 30. The output of the phase shifting unit G is fed to a phase reversal switch H similar to the phase reversal switch E. The output of the phase reversal switch H is in turn connected to the coupling net work 14 where it is mixed with the signal from the swinger 12 of deck A1.

The swingers 12 and 26 of decks A1 and A2 of the selector switch A are mechanically ganged and the unit is arranged so that a complete balancing operation may be carried out by sequentially switching through the four switch positions 1–4 while performing other manipulative steps now to be described.

Referring to FIGURE 3, the transducer or pick-up 10 is suitably associated with the frame 11 of rotor or work piece 13 and a reference mark 15 is placed on the rotor adjacent a suitable stationary scale 17 for indicating the angular position of this mark. The latter is stationarily mounted relative to the rotor. This scale has a zero mark 19 and when the reference mark appears in line with this zero mark under the light of the stroboscopic lamp zero strob reference is said to exist. It will be appreciated that the scale 17 may be dispensed with so long as some type of index marker 19 is provided. Where this is done the operator must estimate the angle of displacement between the reference marker 15 and index marker 19 either in degrees or in terms of the position of the hand of a clock and this necessarily results in some sacrifice in accuracy.

The selector switch A is switched to the first position and the rotor started and brought up to speed. The control 18 of the phase shifter C and the phase reversal switch E are now adjusted for zero strobe reference. At this time the pick-up 10 is feeding a signal through the deck A1 of the selector switch, coupling unit 14, amplitude unit D, phase unit C, and reversing switch E to produce a signal which is indicative of the vibration energizing the pick-up 10. The adjustment of the phase shifted C and phase reversal switch E creates a convenient reference position for the remaining steps in the balancing operation. The rotor is now stopped.

A known weight is now attached to the rotor at the reference mark and the value of this weight is recorded. The selector switch A is advanced to the second position and the rotor is again started and brought up to speed. At this time the pickup 10 feeds a signal through deck A2 and swinger 26 to the amplitude unit F and phase unit G and through the reversal switch H into the coupling network 14. A signal is also fed through deck A1 and swinger 12 to the coupling network 14, amplitude unit D and phase shifter C to the analyzer 20 so that the signal feeding the analyzer is a composite of the signal from the transducer 10 and that from the amplitude and phase units F and G respectively. The control 28 of amplitude unit F, control 30 of phase shifter G and reversal switch H are now adjusted in order to return the indication produced by the analyzer 20 to that which was initially obtained on the first run of the rotor without the trial weight attached. The result of this adjustment is to cause the calibration channel consisting of amplitude unit F, the phase shifter G and reversal switch H to produce a signal which is equal and opposite to that which would ordinarily be produced by the weight which was added to the rotor.

The selector switch A is now advanced to the third position. At this position the transducer 10 is disconnected from swinger 12 but feeds an input into the calibration channel through deck A2 and swinger 26. The output of this channel in turn proceeds through the coupling network 14, amplitude unit D, phase shifter C and reversal switch E to the analyzer 20. Since the value of the weight which was attached to the rotor is known it is now possible to calibrate the reading of the amplitude meter 22 and the analyzer 20. The amplitude unit D is adjusted to provide a convenient weight indication on the meter 22 based on the recorded weight and the control 18 of phase shifter C and reversal switch E are now adjusted to create zero strob reference which electronically provides a zero lag angle between the transducer 10 and strob light 24.

The selector switch A is now advanced to the fourth position. At this position the transducer 10 feeds an input through deck A1 and swinger 12 to the coupling network 14, amplitude unit D and phase shifter C to the analyzer 20. Simultaneously the transducer also feeds an input into the calibration channel consisting of amplitude unit F and phase shifter G. As previously described, the calibration channel is producing a signal equal and opposite to that which would be produced by the known weight attached to the rotor so that the weight produces no effect upon the analyzer 20 which accordingly reads only the signal produced by the unbalance of the rotor under observation. The analyzer has been calibrated as to amplitude and the lag angle has been reduced to zero so that the amplitude and phase readings are direct and indicate the amount and position of unbalance.

It is to be noted that the position indicated by the light 24 is an indication of the light spot on the rotor rather than the heavy spot in view of the fact that at the time the lag angle was reduced to zero the calibration channel was feeding to the analyzer a signal of opposite phase to that which would have been produced by the known weight. If it is desired to have the light 24 indicate the heavy spot it is only necessary to switch the reversal switch E to the opposite position.

It will be apparent from the foregoing that with a unit of this nature it is possible to obtain all of the necessary information to effect balancing in but two runs of the unit and that this information is provided in direct form without the necessity for any computations either as to amplitude or as to position.

Figure 2:
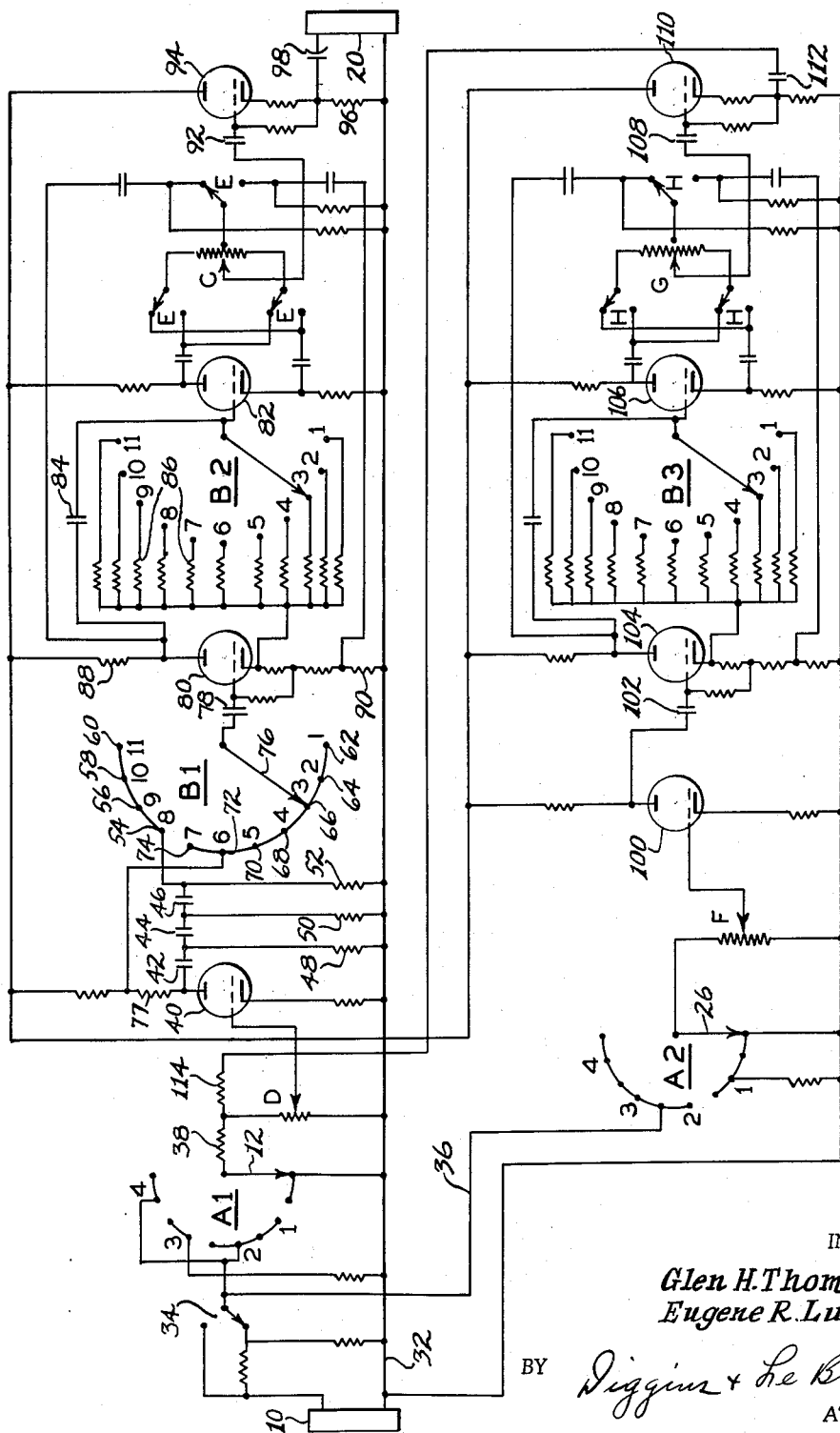
FIGURE 2 is a schematic diagram of the apparatus of FIGURE 1.

Referring now to FIGURE 2 there is shown the circuit diagram of an actual embodiment of the invention. In this embodiment a pick-up 10 has one terminal thereof connected to a ground buss 32 and the other terminal connected through an attenuator switch 34 to contacts 1, 2 and 4 of deck A1 of selector switch A. Attenuator switch 34 is also connected to contacts 2, 3 and 4 of deck A2 via conductor 36. The swinger 12 of deck A1 of the selector switch is connected through a coupling resistor 38 to the amplitude control resistor D. The output selected from the amplitude control resistor D is connected to the grid of a triode amplifier 40. The output of this tube is fed through a filter network consisting of capacitors 42, 44 and 46 and resistors 48, 50 and 52 to the last four contacts 54, 56, 58 and 60 of deck B1 of a speed selector switch B. The remaining contacts 62 through 74 of this switch are connected to the load resistor 77 of triode 40. As the swinger 76 of deck B1 of the speed selector switch B is moved in a clockwise direction, the filter network 42, 44, 46, 48, 50 and 52 following amplifier 40 is a high pass filter for eliminating tube noise at low frequency when the speed selector switch B is set for high speeds.

The swinger 76 of deck B1 of the speed selector switch is connected through a coupling capacitor 78 to the grid of a triode 80. Triode 80 and an additional triode 82, variable resistor C and reversing switch E comprise a phase shift unit capable of providing 360° of phase shift. The coupling capacitor 84 between the plate of triode 80 and the grid of triode 82 and the resistors 86 provide a substantially constant 90° phase shift regardless of the input frequency. Triode 82 provides voltages of plus 180° and minus 180° at the ends of the variable resistor C and a voltage selected by the variable tap on this resistor is added to the voltage across either resistor 88 or 90 in the circuit of triode 80. In this manner a full 360° of phase shift is available at substantially constant voltage throughout the phase shift range. The deck B2 of the speed selector switch which is connected to the resistors 86 is provided in order to select the proper resistor to obtain the previously discussed 90° phase shift at any speed of the test machine.

The output of the phase shift unit comprised of triodes 80 and 82 and associated components is fed through a coupling capacitor 92 to the grid of a cathode follower 94. An output is taken from the cathode resistor 96 of this tube and is fed via coupling capacitor 98 to the vibration analyzer 20.

Considering now the calibration channel, the swinger 26 of deck A2 is fed to the amplitude control resistor F which has its variable tap connected to the grid of a triode amplifier 100. The output of the tube 100 is fed through a coupling capacitor 102 into a phase shifting network consisting of triodes 104 and 106 and speed selector deck B3. This phase shifting unit contains the phase shift variable resistor G and phase reversing switch H and is similar to the unit comprised of triodes 80 and 82 which has been described previously. The output of this phase shifting unit is fed from the variable tap on resistor G through coupling capacitor 108 to a cathode follower 110. An output is taken from this stage via coupling capacitor 112 and is fed through a coupling resistor 114 to the variable resistor D.

The operation of the specific embodiment of the invention shown in FIGURE 2 is identical to that previously described in connection with the block diagram of FIGURE 1. Since the switch connections are the same, the steps enumerated in detail in connection with FIGURE 1 will produce similar operation in the specific embodiment illustrated in FIGURE 2.

With a unit such as illustrated in FIGURES 1 and 2 the procedure for obtaining a single plane balance of a rotor is extremely simple and can be put into such a form that is completely unskilled operator could successfully secure a very adequate balance. As an illustration of the simple and concise nature of the procedure involved, the following directions and data sheet constitute all that is necessary to carry out the balance procedure.

The following four steps apply to the four numbered switch positions of the selector switch A. Start with position 1 and record the data indicated at the respective steps.

(1) Apply a reference mark to the rotor adjacent the stationary scale previously mentioned.

(2) Start rotor. Adjust C and E for zero strob reference. Record amplitude . . . 1.5 mils. Stop rotor.

(3) Add known weight in line with reference mark. Record known weight . . . 2.2 grams. Start rotor and adjust F, G and H for original reading as recorded in data 1.

(4) Adjust C and E for zero strob reference and adjust D to calibrate amplitude meter for convenient weight indication based on recorded trial weight (data 2).

(5) Record amplitude (weight unbalance) and reference mark position . . . 0.925 at 340°. Stop work piece and remove trial weight.

The amplitude indication reads direct in grams to be applied at the indicated position and this correction is made by the operator in any suitable manner.

It will be apparent that with the apparatus of the instant invention no computations are necessary and only two runs are required to effect single plane balancing. A trial weight is added to the rotor in order to calibrate the instrument but it is unnecessary to remove the trial weight and again run the rotor in order to obtain the desired data. The equipment utilized is simple in nature and lends itself to a method which can be set out in mechanical manipulative steps capable of being carried out by an operator who has no particular knowledge of vibration or of balancing operations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A balancing apparatus comprising a transducer and a vibration analyzer, first and second electrical channels connected to said analyzer, each of said channels including means for varying the amplitude and phase of a signal fed therethrough, the output of one of said channels being connected to the input of the other of said channels, and switch means for selectively connecting the input of either one or both of said channels to said transducer.

2. A balancing apparatus comprising a transducer and a vibration analyzer, first and second electrical channels selectively connectable between said transducer and analyzer and each including means for varying the amplitude and phase of a signal fed therethrough, and switch means for sequentially connecting; said first channel between said transducer and analyzer, both channels to said transducer with the output of said first channel being connected to said analyzer and the output of said second channel connected to the input of said first channel, said second channel to said transducer and in cascade with said first channel to said analyzer, and said first channel between said transducer and analyzer with said second channel being connected to said transducer and feeding its output into the input of said first channel.

3. A balancing apparatus comprising a transducer, a measurement channel including a means for varying the amplitude of a signal fed therethrough and a means for varying the phase of a signal fed therethrough, a calibration channel including a means for varying the amplitude of a signal fed therethrough, and a means for varying the phase of a signal fed therethrough, output terminals adapted to be connected to a vibration analyzer, and switch means for sequentially connecting; said measurement channel between said transducer and output terminals, said measurement channel between said transducer and output terminals and said calibration channel between said transducer and the input to said measurement channel; said calibration channel between said transducer and in cascade with said measurement channel to said output terminals; and said measurement channel between said transducer and output terminals and said calibration channel between said transducer and the input to said measurement channel.

4. A balancing apparatus as set out in claim 3 wherein said means for varying phase in both channels provide 360° phase variation at substantially constant signal level.

5. A balancing apparatus as set out in claim 3 wherein both of said channels include means for compensating for variation in the frequency of the signal fed therethrough.

6. A balancing apparatus comprising a transducer and a vibration analyzer a first signal channel including a phase shifter and amplitude control, a second channel including a phase shifter and amplitude control, and switch means for sequentially connecting said first channel between said analyzer and transducer, said first channel between said analyzer and transducer and said second channel between said transducer and the input to said first channel, said second channel between said transducer and in cascade with said first channel to said analyzer, and said first channel between said analyzer and transducer and said second channel between said transducer and the input to said first channel.

References Cited in the file of this patent

UNITED STATES PATENTS

| | | |
|---|---|---|
| 2,243,379 | Johnson | May 27, 1941 |
| 2,338,293 | Martin | Jan. 4, 1944 |
| 2,816,445 | Rambo | Dec. 17, 1957 |
| 2,851,885 | Federn et al. | Sept. 16, 1958 |
| 2,988,918 | King | June 20, 1961 |

FOREIGN PATENTS

| | | |
|---|---|---|
| 1,219,774 | France | Dec. 28, 1959 |